US012688171B2

(12) United States Patent
Subramanian et al.

(10) Patent No.: US 12,688,171 B2
(45) Date of Patent: \*Jul. 21, 2026

(54) OBJECT AND SEQUENCE NUMBER MANAGEMENT

(71) Applicant: NetApp, Inc., San Jose, CA (US)

(72) Inventors: Ananthan Subramanian, San Ramon, CA (US); Sridevi Jantli, San Jose, CA (US); Anil Paul Thoppil, Sunnyvale, CA (US); Cheryl Marie Thompson, Sunnyvale, CA (US); Qinghua Zheng, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/828,077

(22) Filed: Sep. 9, 2024

(65) Prior Publication Data

US 2025/0005003 A1       Jan. 2, 2025

Related U.S. Application Data

(63) Continuation of application No. 17/976,946, filed on Oct. 31, 2022, now Pat. No. 12,086,116, which is a continuation of application No. 16/751,766, filed on Jan. 24, 2020, now Pat. No. 11,487,723, which is a
(Continued)

(51) Int. Cl.
*G06F 16/215*          (2019.01)
*G06F 16/22*           (2019.01)
*G06F 16/23*           (2019.01)

(52) U.S. Cl.
CPC ............ *G06F 16/215* (2019.01); *G06F 16/22* (2019.01); *G06F 16/2379* (2019.01)

(58) Field of Classification Search
CPC ..... G06F 16/215; G06F 16/22; G06F 16/2379
See application file for complete search history.

(56) References Cited

U.S. PATENT DOCUMENTS

| | | | |
|---|---|---|---|
| 5,794,253 | A | 8/1998 | Norin et al. |
| 6,098,074 | A | 8/2000 | Cannon et al. |
| 7,685,109 | B1 | 3/2010 | Ransil et al. |

(Continued)

OTHER PUBLICATIONS

Final Office Action mailed Jan. 5, 2024 for U.S. Appl. No. 17/976,946, filed Oct. 31, 2022, 31 pages.

(Continued)

*Primary Examiner* — Jensen Hu
(74) *Attorney, Agent, or Firm* — Cooper Legal Group, LLC

(57)          ABSTRACT

Techniques are provided for orphan object detection, invalid sequence number detection, and asynchronous object cleanup. A storage system may store data within one or more tiers of storage, such as a storage tier (e.g., solid state storage and disks maintained by the storage system), a remote object store (e.g., storage provided by a third party storage provider), and/or other storage tiers. Orphan objects, within the remote object store, that are no longer used by the storage system may be detected and/or deleted. When an aggregate of volumes is deleted, corresponding objects, within the remote object store, may be identified and/or deleted. Invalid sequence numbers (e.g., lost or corrupt sequence numbers locally maintained in a metafile) assigned to objects within the remote object store may be identified, deleted, and/or fixed.

20 Claims, 9 Drawing Sheets

Related U.S. Application Data continuation of application No. 15/581,447, filed on Apr. 28, 2017, now Pat. No. 10,552,389.

(56) References Cited

U.S. PATENT DOCUMENTS

| | | | |
|---|---|---|---|
| 7,945,750 B2 | 5/2011 | Arakawa et al. | |
| 8,019,732 B2 | 9/2011 | Paterson-Jones et al. | |
| 8,140,786 B2 * | 3/2012 | Bunte | G06F 11/1451 |
| | | | 711/161 |
| 8,495,331 B2 | 7/2013 | Matsumoto et al. | |
| 8,645,973 B2 | 2/2014 | Bosworth et al. | |
| 8,775,485 B1 | 7/2014 | Cavage et al. | |
| 8,959,067 B1 | 2/2015 | Patiejunas et al. | |
| 9,002,805 B1 | 4/2015 | Barber et al. | |
| 9,417,917 B1 | 8/2016 | Barber et al. | |
| 9,507,843 B1 | 11/2016 | Madhavarapu et al. | |
| 9,632,878 B1 | 4/2017 | Maccanti et al. | |
| 9,678,968 B1 | 6/2017 | Taylor et al. | |
| 9,697,226 B1 | 7/2017 | Youngworth | |
| 9,904,962 B1 | 2/2018 | Bastide et al. | |
| 10,031,682 B1 | 7/2018 | George et al. | |
| 10,127,234 B1 | 11/2018 | Krishnan et al. | |
| 10,437,780 B2 | 10/2019 | Zukowski et al. | |
| 10,534,726 B2 | 1/2020 | McHugh et al. | |
| 10,552,389 B2 | 2/2020 | Subramanian et al. | |
| 10,678,753 B2 | 6/2020 | Zukowski et al. | |
| 10,949,089 B2 | 3/2021 | Shah et al. | |
| 11,016,943 B2 | 5/2021 | George et al. | |
| 11,294,861 B2 | 4/2022 | Cruanes et al. | |
| 11,487,723 B2 | 11/2022 | Subramanian et al. | |
| 12,086,116 B2 | 9/2024 | Subramanian et al. | |
| 2003/0066062 A1 * | 4/2003 | Brannock | G06F 8/654 |
| | | | 717/169 |
| 2004/0220970 A1 | 11/2004 | Wilson | |
| 2006/0253502 A1 | 11/2006 | Raman et al. | |
| 2007/0260643 A1 | 11/2007 | Borden et al. | |
| 2008/0250197 A1 * | 10/2008 | Daily | G11B 20/1201 |
| | | | 711/111 |
| 2009/0132779 A1 | 5/2009 | Amaki et al. | |
| 2009/0271412 A1 | 10/2009 | Lacapra et al. | |
| 2009/0276771 A1 | 11/2009 | Nickolov et al. | |
| 2010/0030825 A1 | 2/2010 | Matsuzawa et al. | |
| 2010/0088271 A1 | 4/2010 | Brixius et al. | |
| 2010/0281080 A1 | 11/2010 | Rajaram et al. | |
| 2010/0333116 A1 | 12/2010 | Prahlad et al. | |
| 2012/0297206 A1 * | 11/2012 | Nord | H04L 9/14 |
| | | | 713/193 |
| 2012/0331088 A1 * | 12/2012 | O'Hare | H04L 67/1097 |
| | | | 709/214 |
| 2013/0041872 A1 | 2/2013 | Aizman et al. | |
| 2013/0346444 A1 | 12/2013 | Makkar et al. | |
| 2014/0046909 A1 | 2/2014 | Patiejunas et al. | |
| 2014/0074802 A1 | 3/2014 | Blount et al. | |
| 2014/0143215 A1 | 5/2014 | Chapman et al. | |
| 2014/0195846 A1 | 7/2014 | Resch et al. | |
| 2014/0297604 A1 | 10/2014 | Brand | |
| 2014/0344394 A1 | 11/2014 | Resch | |
| 2014/0351545 A1 | 11/2014 | Nakajima | |
| 2015/0012539 A1 | 1/2015 | Mchugh et al. | |
| 2015/0304306 A1 | 10/2015 | Ponsford et al. | |
| 2015/0317340 A1 | 11/2015 | Sardina et al. | |
| 2016/0140201 A1 | 5/2016 | Cowling et al. | |
| 2016/0156631 A1 | 6/2016 | Viswanathan et al. | |
| 2016/0299934 A1 * | 10/2016 | Karandikar | G06F 16/248 |
| 2017/0230459 A1 | 8/2017 | Lin et al. | |
| 2017/0249310 A1 | 8/2017 | Kumar | |
| 2017/0277726 A1 | 9/2017 | Huang et al. | |
| 2017/0315869 A1 | 11/2017 | Rungta et al. | |
| 2017/0371904 A1 | 12/2017 | Barajas Gonzalez et al. | |
| 2017/0372097 A1 | 12/2017 | Smyth | |
| 2018/0081561 A1 | 3/2018 | Todd et al. | |
| 2018/0095855 A1 | 4/2018 | Sanakkayala et al. | |
| 2018/0225177 A1 * | 8/2018 | Bhagi | G06F 16/164 |
| 2018/0232308 A1 | 8/2018 | Kusters et al. | |
| 2018/0275907 A1 | 9/2018 | Subramanian et al. | |
| 2018/0314449 A1 | 11/2018 | Kondapalli et al. | |
| 2018/0314719 A1 | 11/2018 | Subramanian et al. | |
| 2019/0095458 A1 | 3/2019 | Saradhi et al. | |
| 2019/0213179 A1 | 7/2019 | McHugh et al. | |
| 2023/0052732 A1 | 2/2023 | Subramanian et al. | |

OTHER PUBLICATIONS

Final Office Action mailed on Apr. 5, 2022 for U.S. Appl. No. 16/751,766, filed Jan. 24, 2020, 24 pages.

Non-Final Office Action mailed on Aug. 3, 2023 for U.S. Appl. No. 17/976,946, filed Oct. 31, 2022, 28 pages.

Non-Final Office Action mailed on Jun. 14, 2019 for U.S. Appl. No. 15/581,447, filed Apr. 28, 2017, 22 pages.

Non-Final Office Action mailed on Oct. 6, 2021 for U.S. Appl. No. 16/751,766, filed Jan. 24, 2020, 13 pages.

Notice of Allowance mailed on Dec. 13, 2019 for U.S. Appl. No. 15/581,447, filed Apr. 28, 2017, 8 pages.

Notice of Allowance mailed on Jun. 23, 2022 for U.S. Appl. No. 16/751,766, filed Jan. 24, 2020, 9 pages.

Notice of Allowance mailed on May 13, 2024 for U.S. Appl. No. 17/976,946, filed Oct. 31, 2022, 12 pages.

* cited by examiner

300

Figure 4:
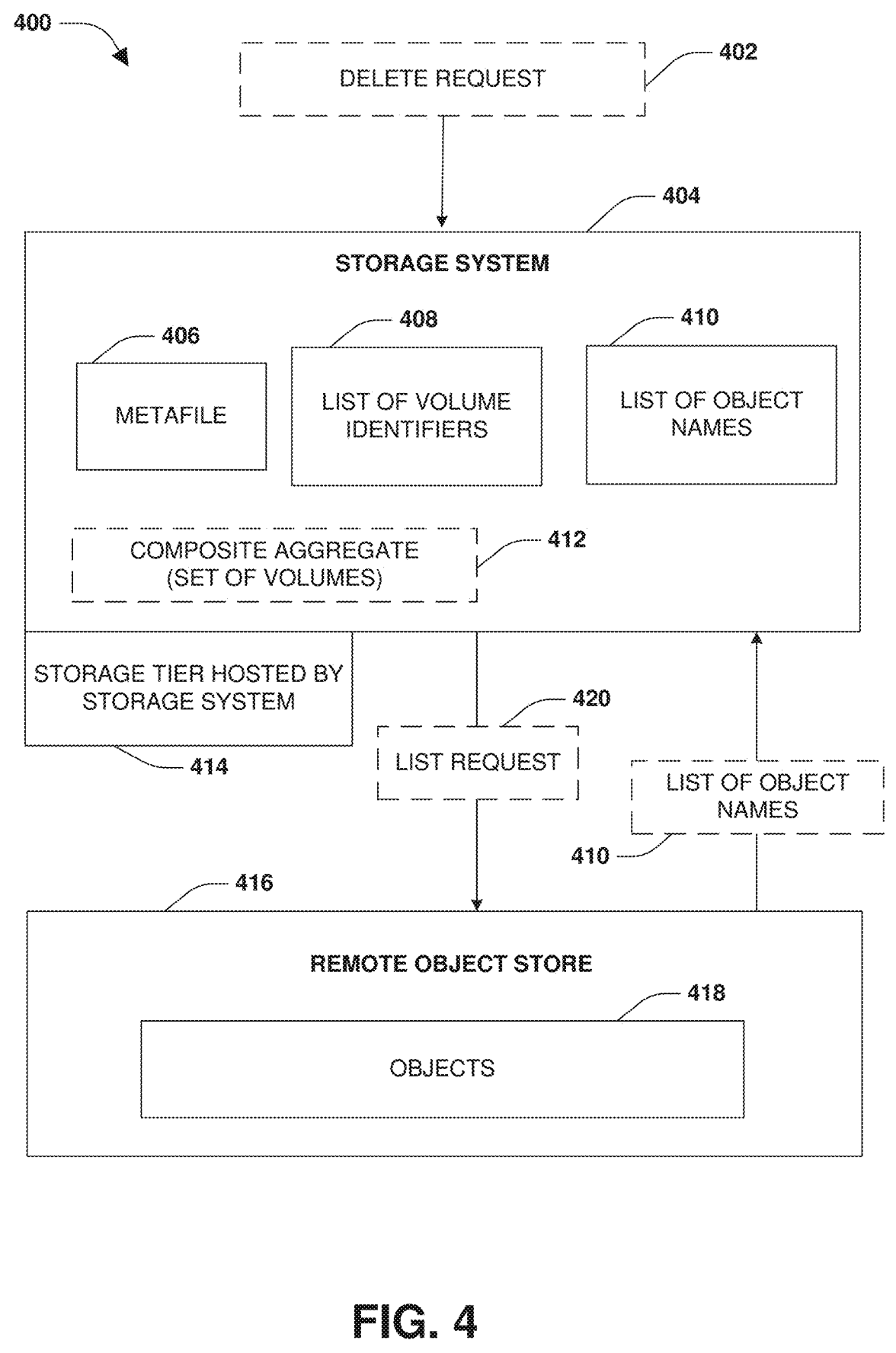

400

402

DELETE REQUEST

404

STORAGE SYSTEM

406

METAFILE

408

LIST OF VOLUME
IDENTIFIERS

410

LIST OF OBJECT
NAMES

412

COMPOSITE AGGREGATE
(SET OF VOLUMES)

STORAGE TIER HOSTED BY
STORAGE SYSTEM

414

420

LIST REQUEST

410

LIST OF OBJECT
NAMES

416

REMOTE OBJECT STORE

418

OBJECTS

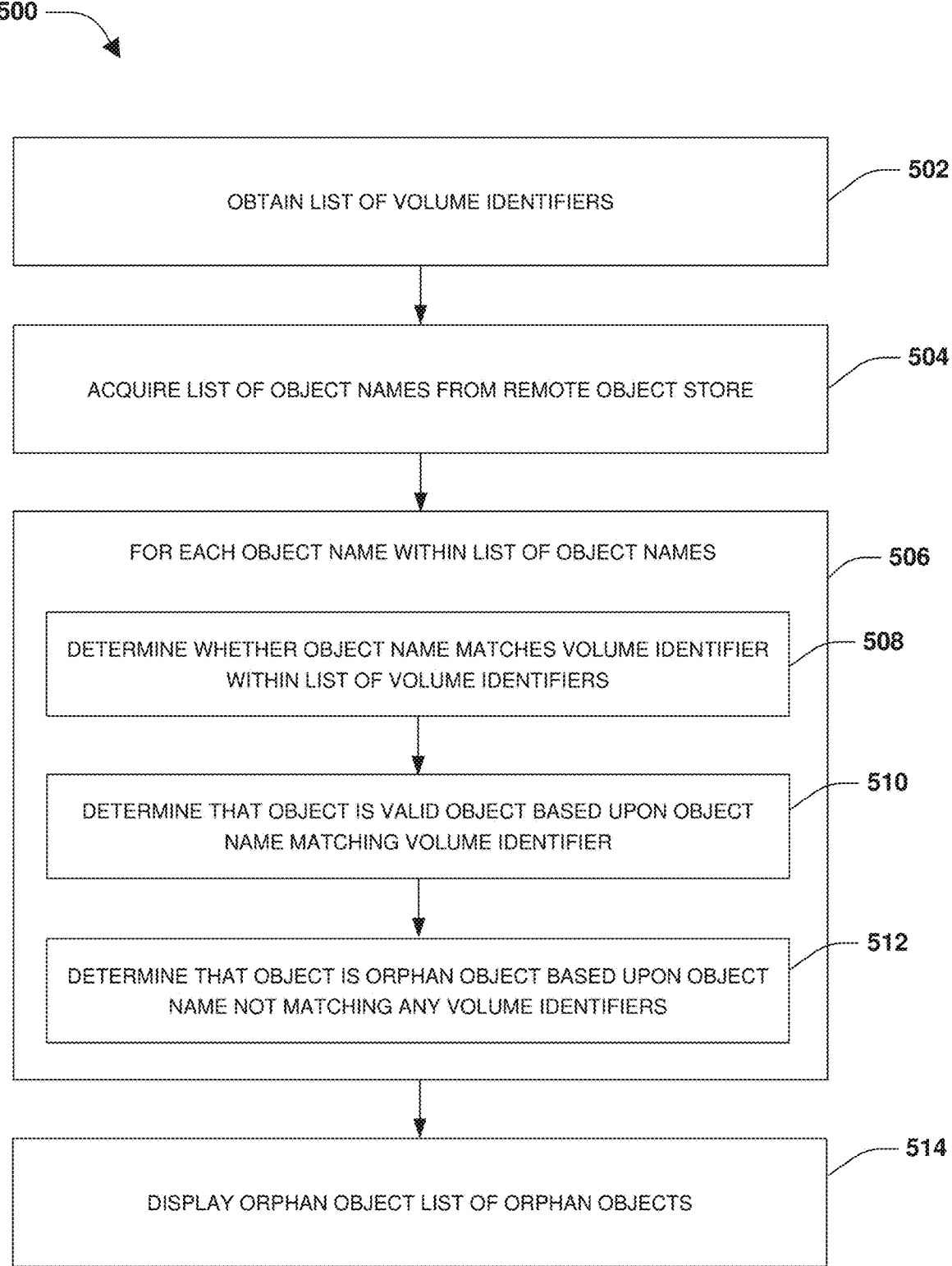

OBTAIN LIST OF VOLUME IDENTIFIERS ⟶ 502

ACQUIRE LIST OF OBJECT NAMES FROM REMOTE OBJECT STORE ⟶ 504

FOR EACH OBJECT NAME WITHIN LIST OF OBJECT NAMES ⟶ 506

DETERMINE WHETHER OBJECT NAME MATCHES VOLUME IDENTIFIER WITHIN LIST OF VOLUME IDENTIFIERS ⟶ 508

DETERMINE THAT OBJECT IS VALID OBJECT BASED UPON OBJECT NAME MATCHING VOLUME IDENTIFIER ⟶ 510

DETERMINE THAT OBJECT IS ORPHAN OBJECT BASED UPON OBJECT NAME NOT MATCHING ANY VOLUME IDENTIFIERS ⟶ 512

DISPLAY ORPHAN OBJECT LIST OF ORPHAN OBJECTS ⟶ 514

FIG. 5

700

OBTAIN LIST OF SEQUENCE NUMBERS SPECIFIED WITHIN METAFILE — 702

ACQUIRE LIST OF OBJECT NAMES FROM REMOTE OBJECT STORE — 704

FOR EACH OBJECT NAME WITHIN LIST OF OBJECT NAMES — 706

DETERMINE WHETHER SEQUENCE NUMBER OF OBJECT MATCHES TARGET SEQUENCE NUMBER WITHIN LIST OF SEQUENCE NUMBERS — 708

DETERMINE THAT SEQUENCE NUMBER IS VALID BASED UPON A MATCH — 710

DETERMINE THAT SEQUENCE NUMBER IS INVALID BASED UPON NO MATCH — 712

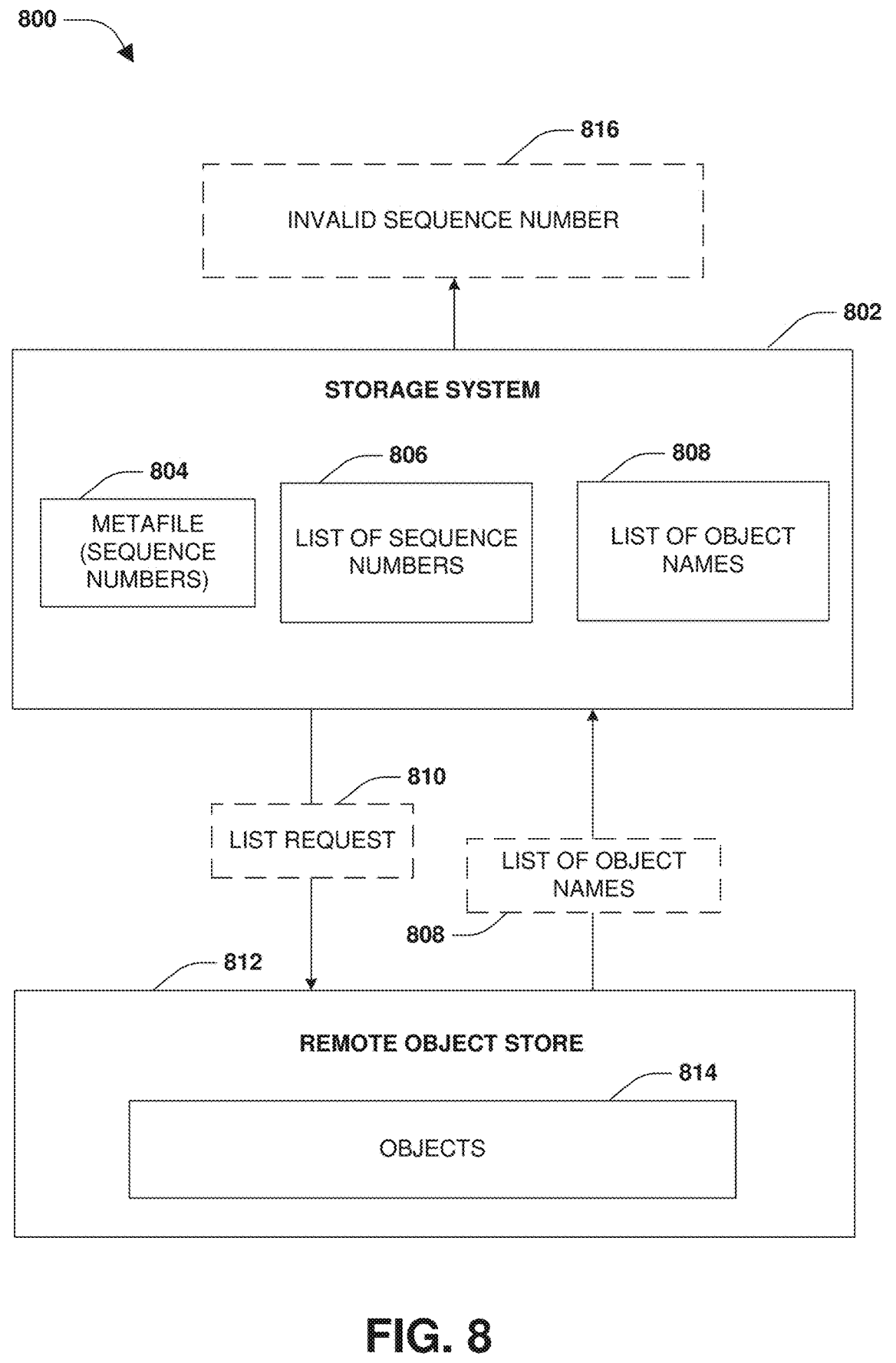

INVALID SEQUENCE NUMBER

802

STORAGE SYSTEM

804

METAFILE
(SEQUENCE
NUMBERS)

806

LIST OF SEQUENCE
NUMBERS

808

LIST OF OBJECT
NAMES

810

LIST REQUEST

LIST OF OBJECT
NAMES

808

812

REMOTE OBJECT STORE

814

OBJECTS

FIG. 8

OBJECT AND SEQUENCE NUMBER MANAGEMENT

RELATED APPLICATIONS

This application claims priority to and is a continuation of U.S. application Ser. No. 17/976,946, filed on Oct. 31, 2022, now allowed, titled "OBJECT AND SEQUENCE NUMBER MANAGEMENT," which claims priority to and is a continuation of U.S. Pat. No. 11,487,723, filed on Jan. 24, 2020, titled "OBJECT AND SEQUENCE NUMBER MANAGEMENT," which claims priority to and is a continuation of U.S. Pat. No. 10,552,389, filed on Apr. 28, 2017, titled "OBJECT AND SEQUENCE NUMBER MANAGEMENT," which are incorporated herein by reference.

BACKGROUND

Many storage systems may provide clients with access to data stored within a plurality of storage devices. For example, a storage controller may store client data within a set of storage devices that are locally accessible (e.g., locally attached to the storage controller) or remotely accessible (e.g., accessible over a network). A storage aggregate (e.g., a composite aggregate comprising a set of volumes) of storage may be generated from the set of storage devices (e.g., the storage aggregate may be stored across one or more storage devices). The storage aggregate may be exported from a storage file system to a client. The storage aggregate may appear as one or more storage containers to the client, such as a volume or logical unit number (lun). In this way, the storage aggregate abstracts away the details, from the client, of how the storage aggregate is physically stored amongst the set of storage devices.

Some storage systems may store data within a multi-tiered storage arrangement. For example, the storage controller may store data within a hard disk drive tier and a solid state storage tier. The hard disk drive tier may be used as a capacity tier to store client data and for processing input/output operations. The solid state storage tier may be used as a cache for accelerating the processing of storage operations. Different storage tiers have different characteristics and behaviors, which can affect performance and guarantees provided to clients by a storage system.

In an example, a storage system may utilize a storage tier (e.g., a local storage tier hosted, owned, and/or managed by one or more nodes of a storage environment associated with the storage system) and a remote object store as two of the storage tiers within which the storage system stores data. The storage system may be able to provide high availability, security, data consistency, data protection, and/or other guarantees using the storage tier because the storage system may manage and control the storage tier. However, the storage system may be unable to provide similar guarantees, such as that data is properly stored, managed, is consistent, and is accurate, to clients for the remote object store because the storage system does not manage and control the remote object store (e.g., a third party provider may host and manage the remote object store). For example, new data could be written to a remote third party object store. When reading the new data, old data or no data could be returned by the remote third party object store due to delay. In another example, local operations such as deleting an aggregate may be quick and efficient to locally implement for the storage tier, while identifying and deleting corresponding objects within the remote third party object store may be slow and delay completion of deleting the aggregate. Thus, the storage system may be unable to provide the same level of enterprise guarantees and efficiencies when working with the remote third party object store as backend storage.

DESCRIPTION OF THE DRAWINGS

FIG. 4 is a component block diagram illustrating an exemplary computing device for asynchronous object cleanup.

FIG. 5 is a flow chart illustrating an exemplary method of orphan object detection.

FIG. 7 is a flow chart illustrating an exemplary method of invalid sequence number detection.

FIG. 8 is a component block diagram illustrating an exemplary computing device for invalid sequence number detection.

DETAILED DESCRIPTION

Figure 1:
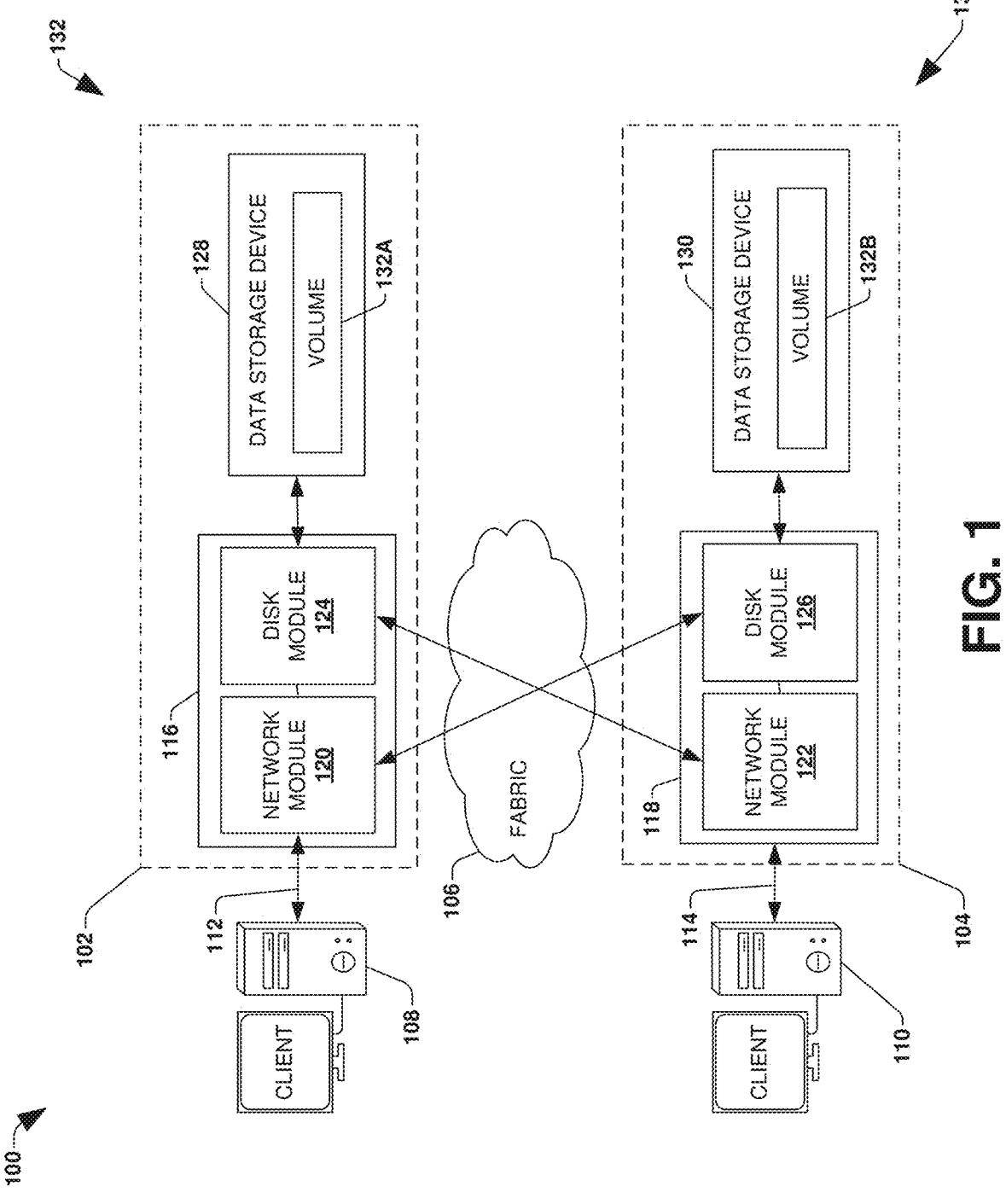
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for orphan object detection, invalid sequence number detection, and asynchronous object cleanup are provided herein. A storage system may utilize multiple tiers of storage to store client data. For example, the storage system may utilize a storage tier (e.g., a performance storage tier, such as a solid state storage tier or a hard disk drive storage tier, locally hosted and/or maintained by nodes of a storage environment associated with the storage system), a remote object store (e.g., a distributed network of storage provided by a third party provider, cloud storage, etc.), and/or other tiers of storage. The storage system may create a composite aggregate of volumes using storage within the storage tier and the remote object store. For example, more frequently accessed or more recently accessed data may be stored within the storage tier because the storage tier may have lower latency than the remote object store. Less frequently accessed or less recently accessed data may be stored within objects maintained by the remote object store.

When the storage system receives a delete request to delete the composite aggregate, data of the volumes of the aggregate must be deleted from the storage tier and objects belonging to the volumes must be deleted from the remote object store. Deleting the data from the storage tier (e.g., from solid state drives, hard disk drives, and/or other storage devices hosted by the storage system) may be quick and efficient. Unfortunately, deleting objects from the remote object store, which may be hosted by a third party provider, may be time consuming and inefficient because objects corresponding to the volumes must be identified and delete operations must be issued to the remote object store for the objects. Such delays can be disruptive to clients because storage of the storage tier may be unavailable until the objects are deleted from the remote object store. Another issue is where stale objects, not referenced or used by the storage system, may remain within the remote object store. Thus, a client may be charged for storing stale data within the remote object store.

Accordingly, as provided herein, data, associated with a composite aggregate that is to be deleted, is deleted from a storage tier (e.g., storage hosted or managed by nodes associated with a storage system) in response to receiving a delete request for the composite aggregate. The data is deleted without waiting for corresponding objects of the composite aggregate to be deleted from a remote object store (e.g., storage hosted or managed by a third party provider such as a cloud storage provider). An asynchronous object cleanup operation is performed (e.g., at a later point in time after the data is deleted from the storage tier and such storage space is freed up, such as after the delete request is acknowledged back to a requestor such as a client as complete) to delete the corresponding objects from the remote object store. In this way, storage of the storage tier may be freed up and available before the asynchronous object cleanup operation is initiated or completes. In another embodiment, orphan objects that are no longer referenced or used by the storage system (e.g., no longer referenced by any volumes of the composite aggregate) may be identified and deleted from the remote object store. In another embodiment, invalid sequence numbers used to reference objects may be identified, deleted, and/or repaired.

To provide for orphan object detection, invalid sequence number detection, and asynchronous object cleanup, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 132B associated with the data storage device 130.

It may be appreciated that orphan object detection, invalid sequence number detection, and asynchronous object cleanup may be implemented within the clustered network environment 100. In an example, the node 108 and/or the node 118 may utilize a remote object store and/or the data storage devices 128, 130 for serving client requests. It may be appreciated that orphan object detection, invalid sequence number detection, and asynchronous object cleanup may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
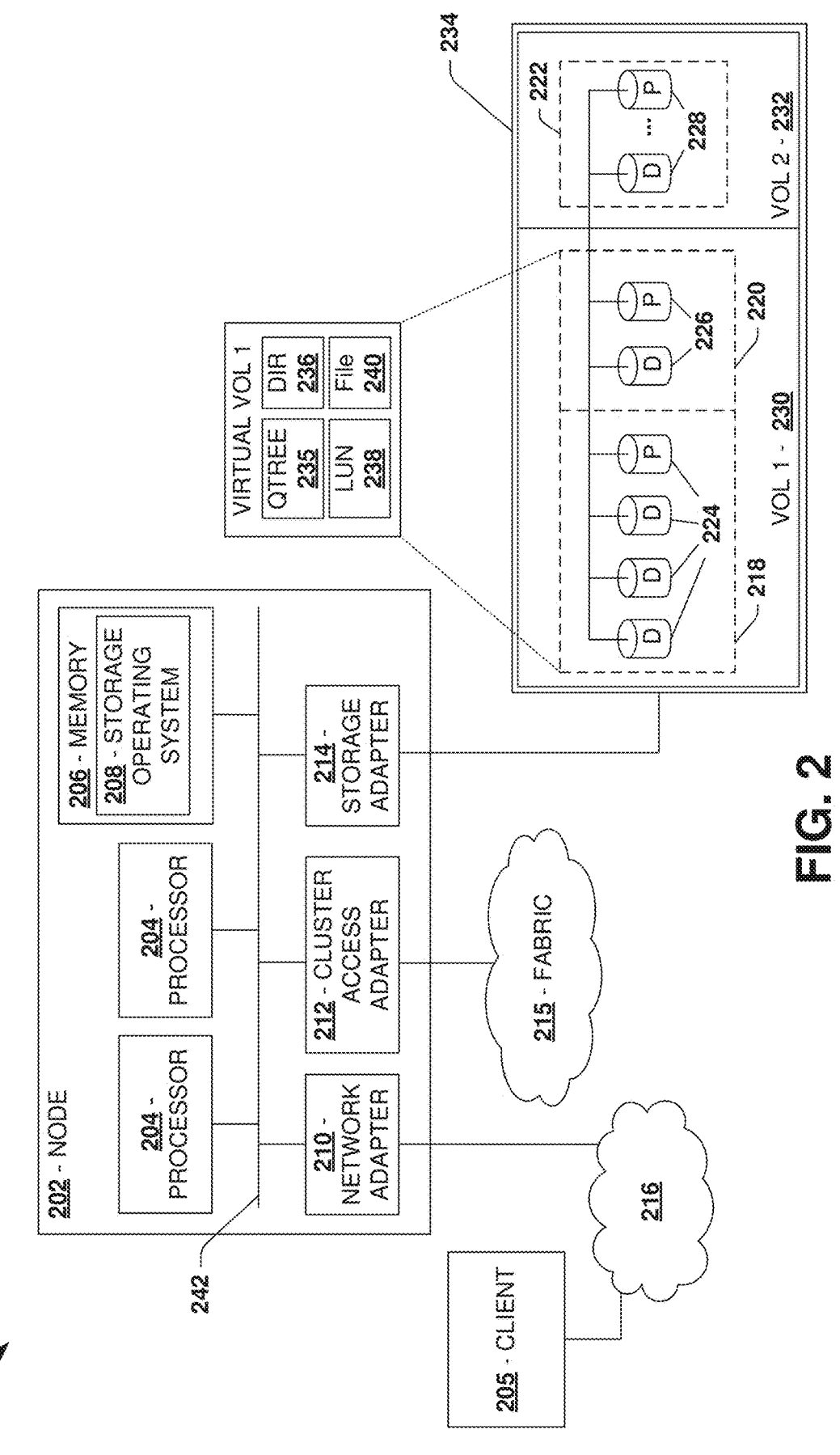
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that orphan object detection, invalid sequence number detection, and asynchronous object cleanup may be implemented for the data storage system 200. In an example, the node 202 may utilize a remote object store for serving client requests. It may be appreciated that orphan object detection, invalid sequence number detection, and asynchronous object cleanup may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
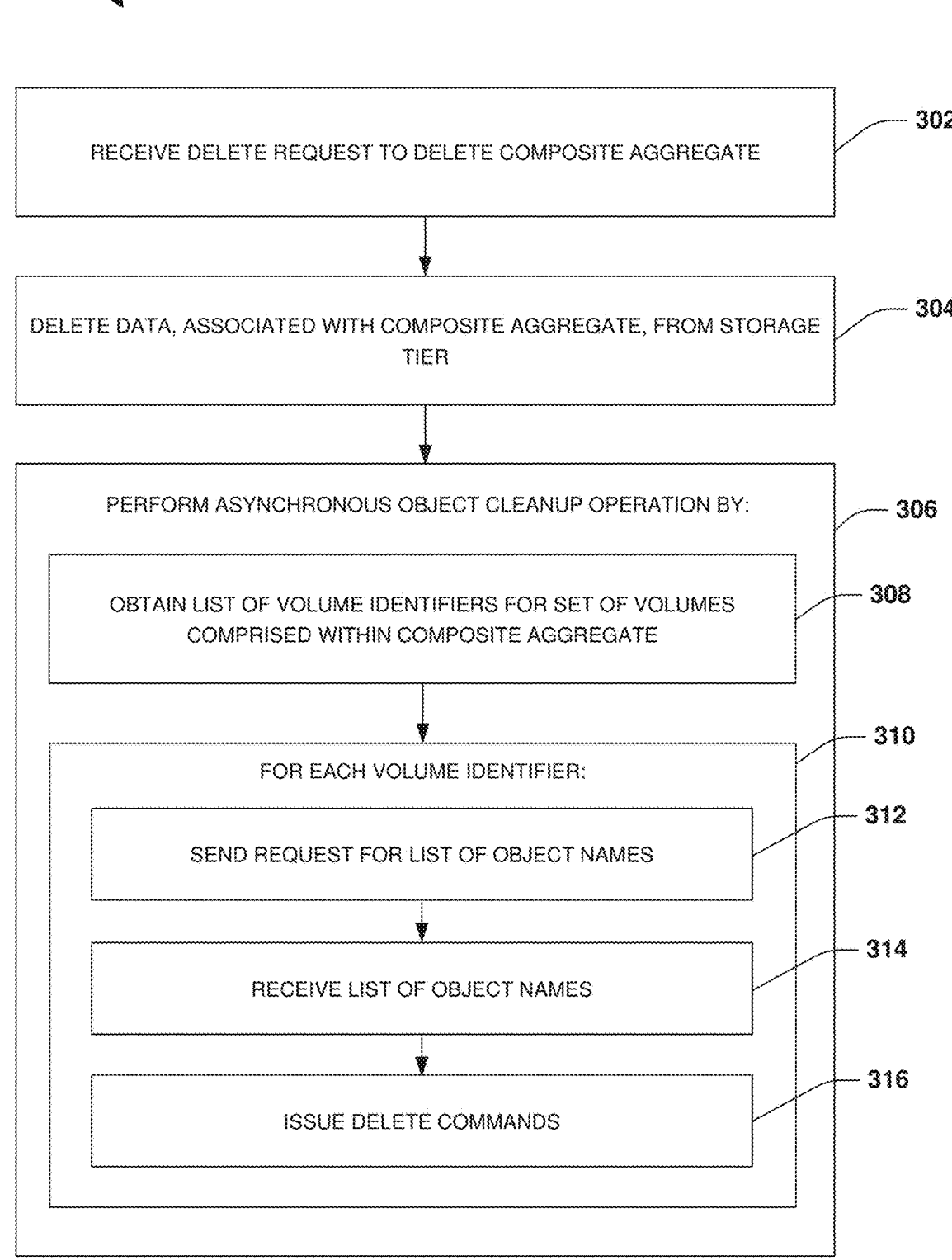
FIG. 3 is a flow chart illustrating an exemplary method of asynchronous object cleanup.

One embodiment of asynchronous object cleanup is illustrated by an exemplary method 300 of FIG. 3. A storage system may provide clients with access to client data stored within a backend. The backend may be configured with one or more tiers of storage. For example, the backend may be configured with a storage tier (e.g., solid state drives, hard disk drives, etc.), a remote object store (e.g., a third party storage provider, cloud storage, etc.), etc. The storage system may store data within the storage tier as a performance tier for frequently or recently accessed data because the storage tier may have lower latency and more guarantees than the remote object store tier. The storage system may migrate data from the storage tier to the remote object store (e.g., less frequently or less recently accessed data) or may store new data to the remote object store.

The storage system may create a composite aggregate composed of a set of volumes that are exposed to clients. Data of the set of volumes may be stored within the storage tier and within objects of the remote object store. An object may be assigned a name based upon a volume identifier of a volume, of the composite aggregate, to which the object belongs. For example, a prefix of the name may be derived from the volume identifier. The name may also be derived from a sequence number uniquely assigned to the object. For example, the prefix of the name may be derived from the sequence number. Monotonically increasing sequence numbers may be assigned to objects that are created within the remote object store for a volume. In an example, the name of the object may be derived from a hash for the volume identifier and/or the sequence number.

The storage system may store objects within the remote object store. An object may comprise a header. The header may comprise a version of the object, an indicator as to whether the object is encrypted, a creation timestamp for the object, a volume identifier (e.g., a buff tree universal identifier such as a buftree-uuid), an identifier of a name of the object (e.g., a hash of the name and the buftree-uuid, which can be read back after a put operation of the object into the remote object store to verify the hash), and/or other information. In one example, the header is 32 bytes or any other size of information.

The object may comprise one or more object pages corresponding to data chunks, such as data chunks derived from data moved from the storage tier (e.g., a performance storage tier, such as a solid state storage tier or a disk storage tier) of the storage system to the remote object store. In one example, the object may comprise space for 1024 object pages, such as a first object page, a second object page, and/or other object pages. The first object page may comprise a first data chunk (e.g., 4 kilobytes of data or any other size of data) and a first context associated with the first object page.

The first context may comprise an indicator as to whether the object is encrypted. The first context may comprise an encryption key index used to identify an encryption key. The first context may comprise a pseudobad indicator to indicate whether data read from the local storage tier had an error such as a disk error and the data content in the object is inconsistent. The first context may comprise an indicator as to whether a RAID or storage OS marked the pseudobad error. The first context may comprise an unverified error indicator to indicate that when data read from the local storage tier resulted in an unverified RAID error. The first context may comprise a wrecked indicator that is set when data is forcefully corrupted. The first context may comprise a file block number (e.g., a location of the file block number for the first data chunk within the first volume). The first context may comprise a checksum for the first data chunk and the first context. In an example, the first context may comprise 16 bytes of information or any other size of information.

At 302, a delete request to delete the composite aggregate may be received such as by the storage system. At 304, data, associated with the composite aggregate, may be deleted from a storage tier (e.g., a local storage tier hosted and/or managed by nodes of a storage environment associated with the storage system, such as hard disk drives and/or solid state drives). In this way, storage space of the storage tier may become available such as for client access and data storage (e.g., before all corresponding objects are deleted from the remote object store).

At 306, an asynchronous object cleanup operation may be performed. In one example, the data within the storage tier may be deleted and the freed storage space may be available to clients irrespective of whether the asynchronous object cleanup operation has been initiated or has completed. At 308, a list of volume identifiers for the set of volumes comprised within the composite aggregate may be obtained. For example, each volume may be assigned its own unique volume identifier. In an example, these volume identifiers may be stored within a cluster-wide database (e.g., an rbd database) that is accessible to a plurality of nodes of a storage environment (e.g., the storage system). The storage environment, associated with the storage system, may host and/or manage the storage tier, while a third party provider may host and/or manage the remote object store. In another example, nodes of clusters of the storage environment may be queried for volume identifiers of volumes currently managed by the nodes.

At 310, for each volume identifier within the list of volume identifiers, a request may be sent to the remote object store for a list of object names of objects having names associated with a volume identifier, at 312. These objects are associated with a volume assigned the volume identifier because objects are named based upon a volume identifier of a volume to which an object belongs. At 314, the list of object names are received from the remote object store (e.g., a list of names of objects that are assigned to the volume, having the volume identifier, of the composite aggregate that was deleted). At 316, delete commands are issued to the remote object store to delete objects having object names within the list of object names. In this way, objects associated with the volume of the deleted composite aggregate are delete. The list of volume identifiers are looped through so that objects of each volume of the deleted composite aggregate are deleted from the remote object store. Because the composite aggregate has been deleted and corresponding objects have been deleted from the remote object store, the list of volume identifiers can be deleted from the cluster-wide database.

FIG. 4 illustrates an example of a system 400 for asynchronous object cleanup. A storage system 404 may host and/or manage a storage tier 414 (e.g., storage locally accessible to one or more nodes of one or more clusters associated with the storage system). The storage system 404 may store data within the storage tier 414, such as client data. The storage system 404 may also store data within objects 418 of a remote object store 416 (e.g., storage provided by a third party storage provider). The storage system 404 may maintain a metafile 406 comprising information related to the objects 418, such as sequence numbers assigned to objects of a volume and a mapping between an object ID (e.g., file system tree pointers point to the object ID and an offset within the object) and an object name. The storage system 404 may maintain a composite aggregate 412 composed of a set of volumes that are exposed to clients.

The storage system 404 may receive a delete request 402 to delete the composite aggregate 412. The storage system 404 may delete data associated with the composite aggregate 412 (e.g., data of the set of volumes) from the storage tier 414 so that storage space is quickly and efficiently freed up for use. In one example, the storage space may be made available and/or the delete request 402 may be acknowledged as complete to a requestor (e.g., a client) before all corresponding objects of the composite aggregate 412 are deleted from the remote object store 416.

The storage system 404 may subsequently perform an asynchronous object cleanup of objects comprising data of the composite aggregate 412 in order to delete such objects from the remote object store 416. The storage system 404 may obtain a list of volume identifiers 408 for the set of volumes of the composite aggregate 412 that was deleted. For each volume identifier within the list of volume identifiers 408, a request 420 is sent to the remote object store 416 for a list of object names 410 of objects that have names associated with a volume identifier. These objects are identified by their object names as belonging to a volume, of the composite aggregate 412, assigned the volume identifier because the volume identifier of the volume to which the object belongs is used to generate an object name for an object. In this way, the storage system 404 issues delete commands to the remote object store 416 to delete objects having object names within the list of object names 410. In this way, the list of volume identifiers 408 are looped through to identify and delete objects from the remote object store 416 that are associated with the composite aggregate 412 that was deleted.

One embodiment of orphan object detection is illustrated by an exemplary method 500 of FIG. 5. A storage system may provide clients with access to client data stored within a backend. The backend may be configured with one or more tiers of storage. For example, the backend may be configured with a storage tier (e.g., solid state drives, hard disk drives, etc.), a remote object store (e.g., a third party storage provider, cloud storage, etc.), etc. The storage system may store data within the storage tier as a performance tier for frequently or recently accessed data because the local storage tier may have lower latency and more guarantees than the remote object store tier. The storage system may migrate data from the storage tier to the remote object store (e.g., less frequently or less recently accessed data) or may store new data to the remote object store.

The storage system may create a composite aggregate composed of a set of volumes that are exposed to clients. Data of the set of volumes may be stored within the storage tier and within objects of the remote object store. An object may be assigned a name based upon a volume identifier of a volume, of the composite aggregate, to which the object belongs. For example, a prefix of the name may be derived from the volume identifier. The name may also be derived from a sequence number uniquely assigned to the object. For example, the prefix of the name may be derived from the sequence number. Monotonically increasing sequence numbers may be assigned to objects that are created within the remote object store for a volume. In an example, the name of the object may be derived from a hash for the volume identifier and/or the sequence number.

When an object is no longer referenced or used by at least one volume or composite aggregate, then the object is an orphan object that comprises stale data wasting storage space of the remote object store (e.g., wasted storage space that a client may be paying for to a third party provider of the remote object store). Accordingly, it may be advantageous to detect and address orphan objects.

At 502, a list of volume identifiers of volumes belonging to composite aggregates of a storage environment may be obtained. For example, nodes of clusters of the storage environment may be queried for volume identifiers of volumes currently managed by the nodes. At 504, a request may be sent to the remote object store for a list of object names of objects maintained by the remote object store for the storage environment. In an example, batch requests for portions of the list of object names may be sent to the remote object store (e.g., a first batch command for a first portion of the list of object names such as 1000 object names; a second batch command for a second portion of the list of object names such as a second 1000 object names; etc.). In this way, the list of object names may be acquired from the remote object store.

At 506, for each object name within the list of object names, a determination is made as to whether an object name matches a volume identifier within the list of volume identifiers, at 508. If the object name matches the volume identifier, then an object having the object name is determined to be a valid object that is used by a volume, of a composite aggregate, assigned the volume identifier because the object name is derived from the volume identifier, at 510. If the object name does not match any volume identifiers, then the object having the object name is determined to be an orphan object that is not used by any volumes of the composite aggregates, at 512.

At 514, an orphan object list of orphan objects determined from the list of object names may be determined and/or displayed such as through a user interface. An orphan volume identifier list of volume identifiers of volumes to which the orphan objects belong may be determined and/or displayed such as through the user interface. Orphan volume identifiers can be identified from object names of orphan objects because object names are derived from volume identifiers of volumes to which objects belong.

In an example, a delete command may be received, such as through the user interface, to delete a particular orphan object from the remote object store since no volumes use or reference that orphan object. Accordingly, a delete operation is sent to the remote object store to delete the orphan object. In another example, a delete all command may be received, such as through the user interface, to delete orphan objects associated with a particular volume identifier. Accordingly, delete operations are sent to the remote object store to delete the orphan objects associated with the volume identifier. In another example, a delete all command may be received, such as through the user interface, to delete all orphan objects within the orphan object list. Accordingly, delete operations are sent to the remote object store to delete the orphan objects within the orphan object list. In another example, a command may be received from a requestor, such as through the user interface, to retrieve data from an orphan object. Accordingly, the orphan object may be retrieved from the remote object store and data from the orphan object may be provided to the requestor.

Figure 6:
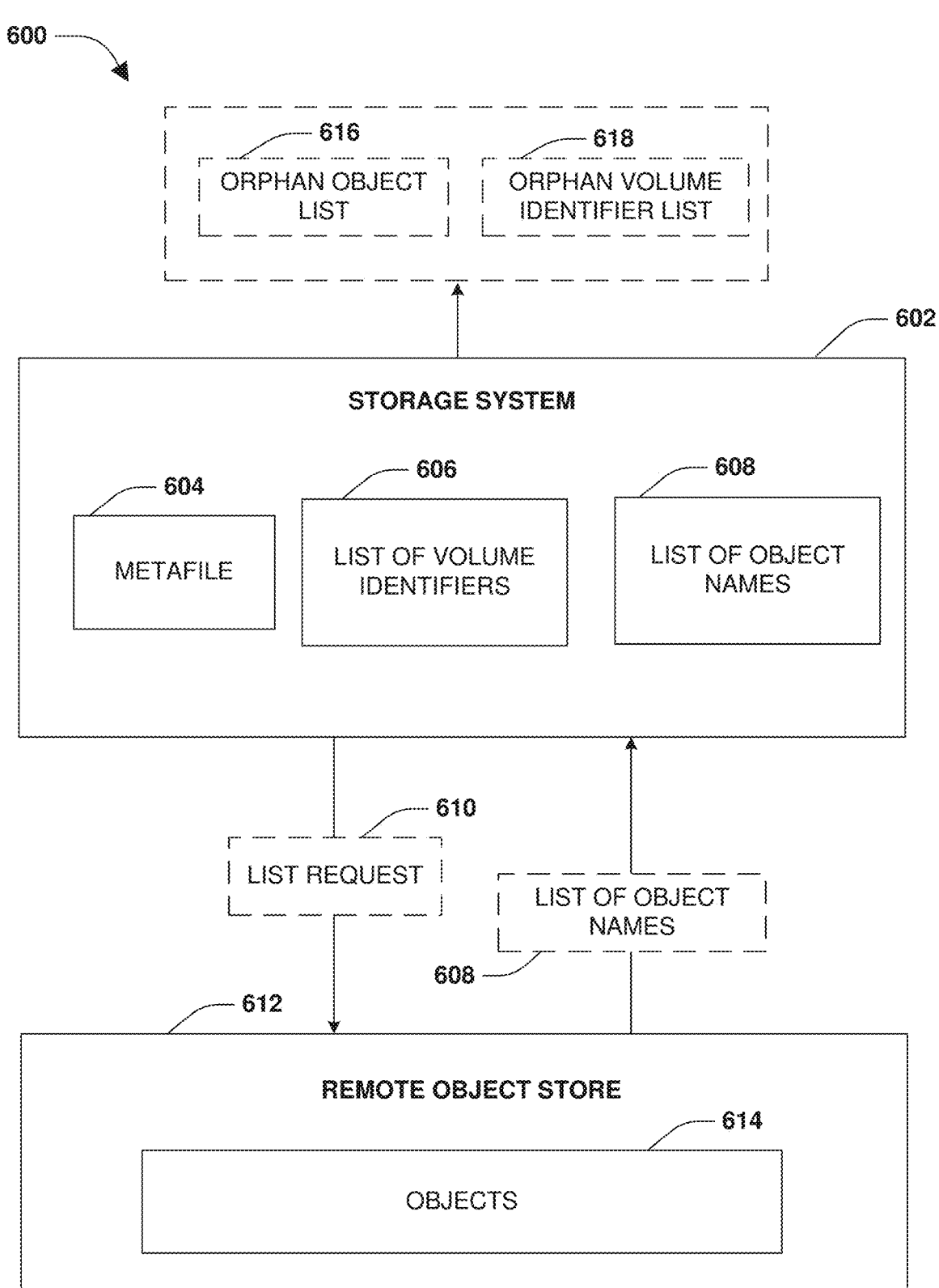
FIG. 6 is a component block diagram illustrating an exemplary computing device for remote object store error handling, where a volume move operation is performed.

FIG. 6 illustrates an example of a system 600 for orphan object detection. A storage system 602 may host and/or manage a storage tier (e.g., storage locally accessible to one or more nodes of one or more clusters associated with the storage system). The storage system 602 may store data within the storage tier, such as client data. The storage system 602 may also store data within objects 614 of a remote object store 612 (e.g., storage provided by a third party storage provider). The storage system 602 may maintain a metafile 604 comprising information related to the objects 614, such as sequence numbers assigned to objects of a volume. The storage system 602 may maintain a composite aggregate composed of a set of volumes that are exposed to clients.

Because the remote object store 612 may end up storing stale orphan objects (e.g., due to corruption of the metafile 604 where an object is no longer referenced, due to no more volumes or other storage structures referencing or using data within an object, etc.), orphan object detection may be implemented. A list of volume identifiers 606 of volumes belonging to composite aggregates of a storage environment associated with the storage system 602 may be obtained. A request 610 may be sent to the remote object store 612 for a list of object names 608 of objects maintained by the remote object store 612 for the storage environment. For each object name within the list of object names 608, a determination is made as to whether an object name of an object matches any volume identifier within the list of volume identifiers 606. If the object name of the object matches a volume identifier within the list of volume identifiers 606, then the object is determined as a valid object belonging to a volume having the volume identifier (e.g., the object comprises data associated with at least one volume). If the object name does not match any volume identifiers within the list of volume identifiers 606, then the object is determined as an orphan object that does not belong to any volumes. In this way, an orphan object list 616 and/or an orphan volume identifier list 618 (e.g., volume identifiers of orphan objects) may be determined and/or provided/displayed.

One embodiment of invalid sequence number detection is illustrated by an exemplary method 700 of FIG. 7. A storage system may provide clients with access to client data stored within a backend. The backend may be configured with one or more tiers of storage. For example, the backend may be configured with a storage tier (e.g., solid state drives, hard disk drives, etc.), a remote object store (e.g., a third party storage provider, cloud storage, etc.), etc. The storage system may store data within the storage tier as a performance tier for frequently or recently accessed data because the local storage tier may have lower latency and more guarantees than the remote object store tier. The storage system may migrate data from the storage tier to the remote object store (e.g., less frequently or less recently accessed data) or may store new data to the remote object store.

The storage system may create a composite aggregate composed of a set of volumes that are exposed to clients. Data of the set of volumes may be stored within the storage tier and within objects of the remote object store. An object may be assigned a name based upon a volume identifier of a volume, of the composite aggregate, to which the object belongs. For example, a prefix of the name may be derived from the volume identifier. The name may also be derived from a sequence number uniquely assigned to the object. For example, the prefix of the name may be derived from the sequence number. Monotonically increasing sequence numbers may be assigned to objects that are created within the remote object store for a volume. In an example, the name of the object may be derived from a hash for the volume identifier and/or the sequence number. Sequence numbers of objects may be stored within a metafile used to store information relating to objects stored within the remote object store such as a mapping between an object ID (e.g., file system tree pointers point to the object ID and an offset within the object) and an object name.

Unfortunately, a sequence number can become lost or corrupt from within the metafile. Accordingly, as provided herein, invalid sequence numbers are detected. At 702, a list of sequence numbers specified within the metafile are obtained. At 704, a request may be sent to the remote object store for a list of object names of objects having names derived from sequence numbers monotonically assigned to such objects. In this way, the list of object names may be acquired from the remote object store.

Sequence numbers are unique for a particular volume identifier of a particular volume (e.g., sequence numbers are not unique across buftree UUIDs but only within). In an example where the volume identifier comprises a buftree UUID of XX, a storage file system knows about objects XX-1, XX-2, XX-4, and XX-7 where 1, 2, 4, and 7 are sequence numbers for the buftree UUID of XX. Orphan object detection may be performed to determine whether there are other unknown objects for the buftree UUID of XX such as XX-9. In an example, if the remote object store has an object with YY-8 where YY is a buftree UUID and 8 is a sequence number, then sequences numbers for the buftree UUID of YY may be evaluated to see if there is a YY-8. If not, then the object is an orphan object.

At 706, for each object name within the list of object names, a determination is made as to whether a sequence number within a name of an object matches any sequence numbers within the list of sequence numbers, at 708. If the sequence number matches a target sequence number within the list of sequence numbers, then the sequence number is determined to be valid, at 710. If the sequence number does not match any sequence numbers within the list of sequence number, then the sequence number is determined to be invalid (e.g., lost or corrupt from within the metafile, and thus an object assigned the sequence number may be unidentifiable from the metafile for access from the remote object store such as for servicing client requests using data within the object). In an example, the metafile may be determined, based upon the sequence number being invalid, to be corrupt where the sequence number has been lost or corrupted from within the metafile.

In an example, an indicator that the sequence number is invalid may be displayed such as through a user interface. In another example, the sequence number may be inserted back into the metafile. In another example, a command may be received from a requestor to retrieve data from the object associated with the sequence number that is invalid. Accordingly, the object may be retrieved from the remote object store, and data of the object may be provided to the requestor.

FIG. 8 illustrates an example of a system 800 for invalid sequence number detection. A storage system 802 may host and/or manage a storage tier (e.g., storage locally accessible to one or more nodes of one or more clusters associated with the storage system). The storage system 802 may store data within the storage tier, such as client data. The storage system 802 may also store data within objects 814 of a remote object store 12 (e.g., storage provided by a third party storage provider). The storage system 802 may maintain a metafile 804 comprising information related to the objects 814, such as sequence numbers assigned to objects of a volume. The storage system 802 may maintain a composite aggregate composed of a set of volumes that are exposed to clients.

Because the sequence numbers may become lost or corrupt within the metafile 804 (referred to as invalid sequence numbers), invalid sequence number detection may be implemented. The storage system 802 may obtain a list of sequence numbers 806 specified within the metafile 804. Each object within the remote object store 812 may be assigned a unique sequence number. An object name of an object may be derived from a sequence number assigned to the object. The storage system 802 may send a request 810 to the remote object store for a list of object names 808 of objects maintained by the remote object store 812 for the storage system 802. In this way, the list of object names 808 are obtained from the remote object store 812.

The storage system 802 may loop through each object name within the list of object names 808 to identify invalid sequence numbers. In particular, for each object name within the list of object names 808, a determination is made as to whether a sequence number within a name of an object matches any sequence number within the list of sequence numbers 806. If the sequence number matches a target sequence number within the list of sequence numbers 806, then the sequence number is determined to be valid. If the sequence number does not match any sequence number within the list of sequence numbers 806, then the sequence number is determined to be an invalid sequence number 816 that has been lost or corrupted within the metafile 804.

Figure 9:
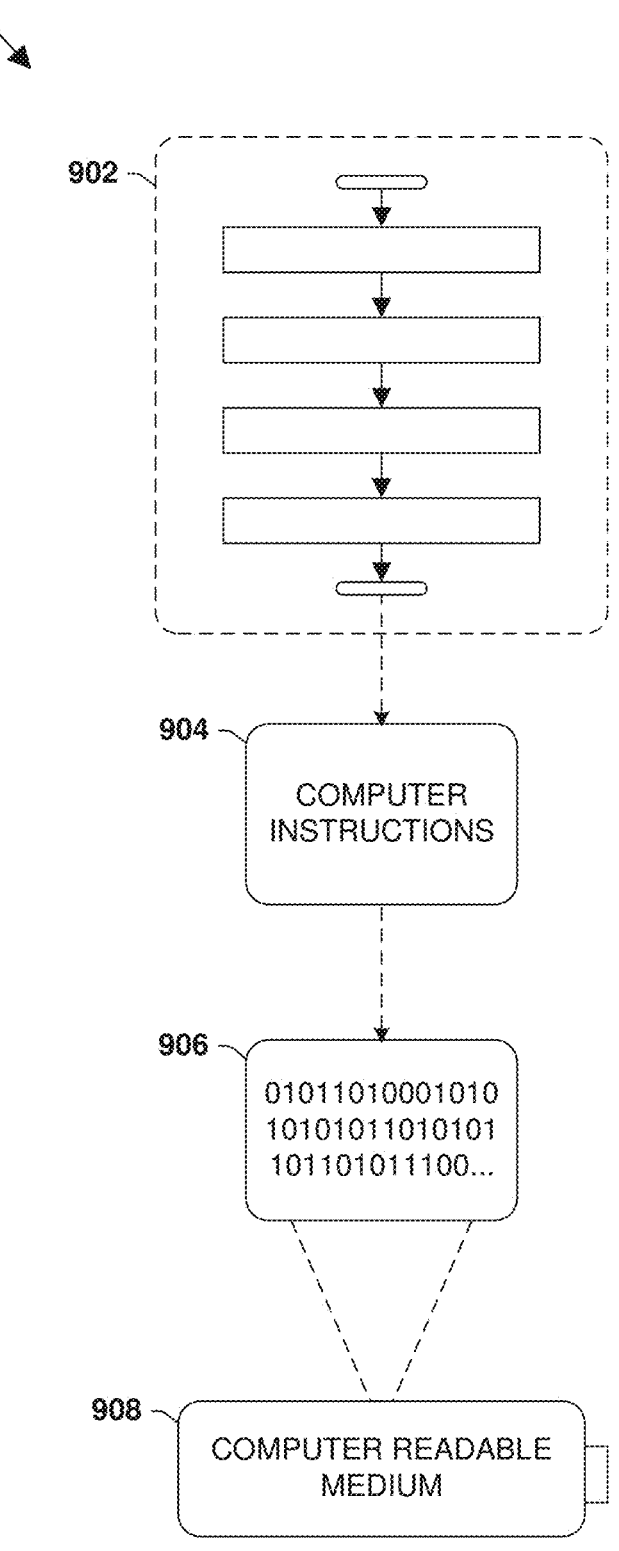
FIG. 9 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 9, wherein the implementation 900 comprises a computer-readable medium 908, such as a compact disc-recordable (CD-R), a digital versatile disc-recordable (DVD-R), flash drive, a platter of a hard disk drive, etc., on which is encoded computer-readable data 906. This computer-readable data 906, such as binary data comprising at least one of a zero or a one, in turn comprises a processor-executable computer instructions 904 configured to operate according to one or more of the principles set forth herein. In some embodiments, the processor-executable computer instructions 904 are configured to perform a method 902, such as at least some of the exemplary method 300 of FIG. 3, at least some of the exemplary method 500 of FIG. 5, and/or at least some of the exemplary method 700 of FIG. 7, for example. In some embodiments, the processor-executable computer instructions 904 are configured to implement a system, such as at least some of the exemplary system 400 of FIG. 4, at least some of the exemplary system 600 of FIG. 6, and/or at least some of the exemplary system 800 of FIG. 8, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM) s, CD-Rs, compact disk re-writeable (CD-RW) s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
creating a composite aggregate composed of a volume exposed to clients, wherein data of the volume is stored across a storage tier and within objects of a remote object store;
creating an object comprising an object header and an object page for storing to a data chunk, of the volume, being moved from the storage tier to the remote object store, wherein the creating comprises:
generating an object name for the object based upon a volume identifier of the volume referencing the data chunk;
populating the object header with an identifier of the object name;
populating the object page with the data chunk and a context associated with the object page; and
storing the object into the remote object store;
comparing the object name, determined from the identifier within the object header, with the volume identifier of the volume to determine whether the object name and volume identifier match;
in response to the object name and volume identifier matching, providing access to the data chunk according to the context associated with the object page; and
in response to the object name and volume identifier not matching, determining that the object is no longer referenced by the volume.

2. The method of claim 1, further comprising:
assigning the object name based upon the volume identifier and a sequence number assigned to the object for referencing the object; and
utilizing the sequence number within the object name to validate a metafile used by a storage system to track objects, within the remote object store, storing data of the volume.

3. The method of claim 2, further comprising:
creating a hash for the object storing the data chunk, wherein the hash is created from both the volume identifier of the volume referencing the data chunk and the sequence number assigned to the object for referencing the object; and
deriving the object name for the object based upon the hash, wherein the object name is verified by reading the hash from the object within the remote object store.

4. The method of claim 1, further comprising:
generating the identifier of the object name based upon a hash of a buff tree universal identifier used as the volume identifier; and
in response to storing the object into the remote object store, reading the hash back from the object within the remote object store to verify the object.

5. The method of claim 1, further comprising:
in response to the object name and the volume identifier matching, specifying that the object is a valid object used by the volume;
comparing a sequence number of the valid object with a list of sequence numbers within a metafile; and
in response to the sequence number not matching at least one sequence number within the list of sequence numbers, designating the metafile as corrupt.

6. The method of claim 1, further comprising:
in response to the object name not matching at least one volume identifier of volumes of the composite aggregate, designating the object as an orphan object no longer referenced by at least one volume of the composite aggregate; and issuing a delete command to the remote object store to delete the orphan object based upon the orphan object being designated as no longer being referenced by the composite aggregate.

7. The method of claim 1, wherein the composite aggregate is composed of a plurality of volumes that include the volume, and wherein the method further comprises:

in response to the object name not matching at least one volume identifier of the plurality of volumes, deleting the object from the remote object store.

8. The method of claim 1, further comprising:

defining the context of the object page to specify an error indicator as to whether there is an error associated with reading the data chunk to create the object; and utilizing the context to determine whether to provide access to the data chunk.

9. The method of claim 1, wherein the composite aggregate is composed of a plurality of volumes that include the volume, and wherein the method further comprises:

in response to the object name not matching at least one volume identifier of the plurality of volumes of the composite aggregate, designating the object as an orphan object no longer referenced by at least one volume of the composite aggregate;

evaluating the object name of the orphan object to identify orphan volume identifiers of volumes to which the object previously belonged; and providing the orphan volume identifiers to a user for selective deletion of the orphan object.

10. The method of claim 1, comprising:

obtaining a list of volume identifiers of volumes with which the composite aggregate is composed;

transmitting a request to the remote object store for a list of object names of objects stored by the remote object store, wherein the list of object names includes the object name of the object;

comparing the list of volume identifiers with the list of object names;

in response to the object name of the object matching at least one volume identifier within the list of volume identifiers, retaining the object within the remote object store; and in response to the object name of the object not matching at least one volume identifier within the list of volume identifiers, deleting the object from the remote object store.

11. A computing device comprising:

a memory comprising machine executable code; and a processor coupled to the memory, the processor configured to execute the machine executable code to cause the computing device to:

determine that a data chunk, of a volume, is to be moved from a storage tier to a remote object store, wherein the volume is part of a composite aggregate of data stored across the storage tier and the remote object store;

create an object comprising an object header and an object page for storing the data chunk, wherein the object is created by:

generating an object name for the object based upon a volume identifier of the volume referencing the data chunk;

populating the object header with an identifier of the object name;

populating the object page with the data chunk and a context associated with the object page; and storing the object into the remote object store; and compare the object name, determined from the identifier within the object header, with the volume identifier of the volume to determine whether the object name and volume identifier match;

in response to the object name and volume identifier matching, provide access to the data chunk according to the context associated with the object page; and in response to the object name and volume identifier not matching, determine that the object is no longer referenced by the volume.

12. The computing device of claim 11, wherein the machine executable code cause the computing device to:

in response to the object name not matching at least one volume identifier of volumes of the composite aggregate, designate the object as an orphan object no longer referenced by at least one volume of the composite aggregate; and delete the orphan object based upon the orphan object being designated as no longer being referenced by the composite aggregate.

13. The computing device of claim 11, wherein the machine executable code cause the computing device to:

in response to the object name not matching at least one volume identifier of volumes of the composite aggregate, designate the object as an orphan object no longer referenced by at least one volume of the composite aggregate;

evaluate the object name of the orphan object to identify orphan volume identifiers of volumes to which the object previously belonged; and provide the orphan volume identifiers to a user for deleting the orphan object from the remote object store.

14. The computing device of claim 11, wherein the machine executable code cause the computing device to:

obtain a list of volume identifiers of volumes with which the composite aggregate is composed;

transmit a request to the remote object store for a list of object names of objects stored by the remote object store, wherein the list of object names includes the object name of the object;

compare the list of volume identifiers with the list of object names;

in response to the object name of the object matching at least one volume identifier within the list of volume identifiers, retain the object within the remote object store; and in response to the object name of the object not matching at least one volume identifier within the list of volume identifiers, delete the object from the remote object store.

15. The computing device of claim 11, wherein the machine executable code cause the computing device to:

generate the identifier of the object name based upon a hash of a buff tree universal identifier used as the volume identifier; and in response to storing the object into the remote object store, read the hash back from the object within the remote object store to verify the object.

16. The computing device of claim 11, wherein the machine executable code cause the computing device to:

assign the object name based upon the volume identifier and a sequence number assigned to the object for referencing the object; and utilize the sequence number within the object name to validate a metafile used by a storage system to track objects, within the remote object store, storing data of the volume.

17. A non-transitory machine readable medium comprising instructions for performing a method, which when executed by a machine, causes the machine to:

determine that a data chunk, of a volume, is to be moved from a storage tier to a remote object store;

create an object comprising an object header and one or more an object page for storing the data chunk, wherein the object is created by:

generating an object name for the object based upon a volume identifier of the volume referencing the data chunk;

populating the object header with an identifier of the object name;

populating the object page with the data chunk; and storing the object into the remote object store; and compare the object name, determined from the identifier within the object header, with the volume identifier of the volume to determine whether the object name and volume identifier match;

in response to the object name and volume identifier matching, provide access to the data chunk; and in response to the object name and volume identifier not matching, determine that the object is no longer referenced by the volume.

18. The non-transitory machine readable medium of claim 17, wherein the instructions cause the machine to:

assign the object name based the volume identifier and a sequence number assigned to the object for referencing the object; and utilize the sequence number within the object name to validate a metafile used by a storage system to track objects, within the remote object store, storing data of the volume.

19. The non-transitory machine readable medium of claim 17, wherein the instructions cause the machine to:

create a hash for the object storing the data chunk, wherein the hash is created from both the volume identifier of the volume referencing the data chunk and a sequence number assigned to the object for referencing the object;

derive the object name for the object based upon the hash; and verify the object name of the object by reading the hash from the object within the remote object store.

20. The non-transitory machine readable medium of claim 17, wherein the instructions cause the machine to:

generate the identifier of the object name based upon a hash of a buff tree universal identifier used as the volume identifier; and in response to storing the object into the remote object store, read the hash back from the object within the remote object store to verify the object.

* * * * *